July 5, 1932.  F. L. SIMON  1,866,133

EDUCATIONAL DEVICE

Filed July 1, 1929

INVENTOR

Fred L. Simon

BY

William W. Varney

ATTORNEY

Patented July 5, 1932

1,866,133

UNITED STATES PATENT OFFICE

FRED L. SIMON, OF BALTIMORE, MARYLAND

EDUCATIONAL DEVICE

Application filed July 1, 1929. Serial No. 375,278.

My device is for teaching contract bridge, and should be very valuable for the use of those qualified to teach the game in instructing their pupils, and should also be found a very valuable aid to the pupils themselves in learning and memorizing the bidding requirements.

The object of my invention is the providing of a game implement to be used as an educational device in the playing of cards, whereby the several players may approximately determine the combined strength of partners' hands held by a simple manipulation of the device and obtain a suggestion therefrom as to what would be a probable proper bid to make.

With the foregoing and other objects in view, my invention consists of the novel construction, combination and arrangement of parts as hereinafter specifically described and illustrated in the accompanying drawing, wherein is shown the preferred embodiment of my invention, but it is understood that changes, variations and modifications may be resorted to which come within the scope of the claims hereunto appended.

While there are many card games for which the device may be used, the drawing shows the device as applied to the game of contract bridge.

In the drawing of the herein-described embodiment of my invention, one side of the device, Fig. 1, is arranged for no-trump bids, and the other side, Fig. 2, for suit bids. In both cases, the player contemplating an original bid, uses the upper group of indicia to determine the amount of his bid. His partner then moves the center group of indicia along until its zero line is under that bid, and, having counted his hand in accordance with the card values indicated, reads on the lower group of indicia, under his count on the center group of indicia, the amount of his jump or bid.

The no-trump side of the device also informs the original bidder as to the counts he should have to re-bid one and two higher than his partner's jump. (Note the arrows marked Re-bids +1 and +2.

In Fig. 1, an original bid of two no-trump (with a count of 17) has been made, and the bidder's partner, having placed the zero line of the sliding group of indicia under that bid, is advised by the relation of the indicia on the sliding member to the set of indicia below it that he may jump the bid to three with a count of 6 (or with an ace plus a count of one), to four with a count of 13, etc. The bottom group of indicia also tells him the necessary combined counts of the two hands for the various bids. Then, assuming that the partner bids three no-trump, the original two-bidder refers to the device to note that, with a count of 20, he may re-bid (or raise to) four no-trump, or with a count of 22, five no-trump.

In Fig. 2, the device is in position for an original bid of one heart, spade, club or diamond, and the partner learns from the relation between the indicia on the sliding member to the set of indicia below it that he may jump to two with a count of 13, to three with 17, etc.

Figure 1:
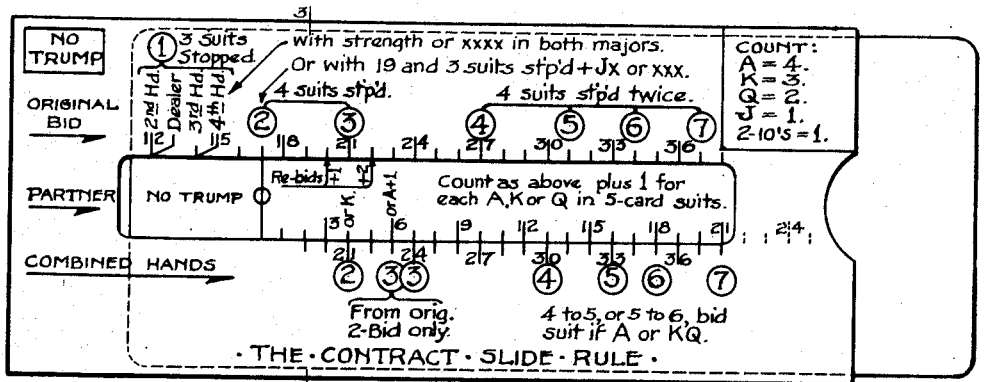
Figures 2, 3:
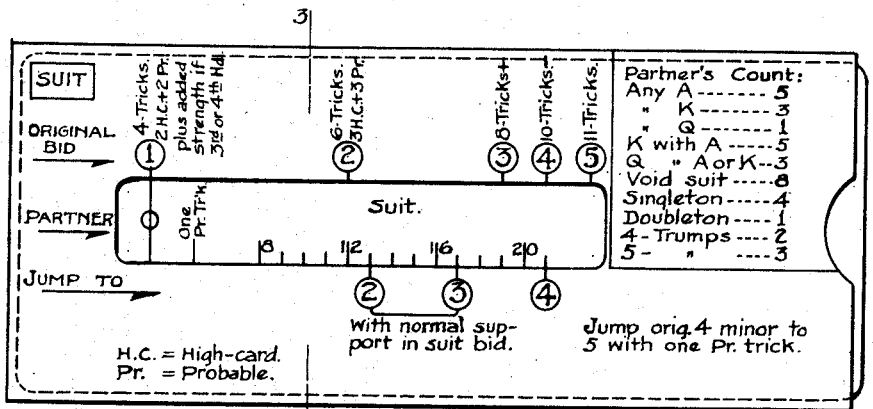
Fig. 3 is a cross-section of the device of Figs. 1 and 2 on line 3—3.
Figure 4:
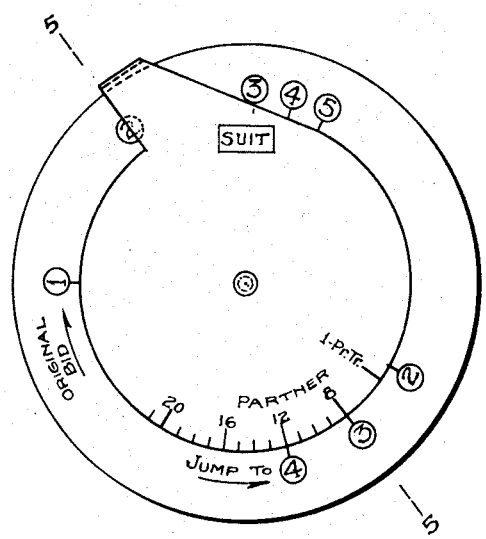
Fig. 4 shows how the same purpose may be accomplished on a circular device with a rotating member, using the same notations as in Figs. 1 and 2, no-trump on one side, suit bids on the other.
Figure 5:
Fig. 5 is a section of the device of Fig. 4 along the line 5—5.

The need in contract bridge for more accurate estimates of hand values has popularized the "count" method, not only for no-trump, but for suit bids as well. My educational device is an aid to the player in memorizing the system and becoming accustomed to its application.

The player will find that after a dozen or so practice rubbers with the device on the table, the essential figures of the "count" values and requirements will be impressed upon his memory by reason of the simplicity and clarity with which the device presents them, and the graphic mental picture of the device's arrangement which he carries away with him. And even if he has no intention of the continued use of "counting" in his contract, he will discover that a temporary employment of the device has increased his knowledge of the bidding, given him a keener appreciation of hand values and developed his contract judgment.

The educational device employs the "count" system as recognized by authorities on bridge, and, by the consistent precision of their methods and studies and the avoidance of fractions, has made the device possible.

*Description.*—The device indicates no-trump bids, jumps and re-bids on one side, and suit bids and jumps on the other.

The no-trump side contains an upper, fixed group of indicia, representing the hand of the original bidder, a central, movable group of indicia representing the hand of his partner, and a lower, fixed group of indicia which indicates the combined strength of the two hands and the jumping requirements.

The arrangement of the suit side of the device is similar, except that the hand of the original bidder (upper indicia) is estimated simply by the tricks in it.

*Operation.*—The player contemplating an original bid "counts" his hand, numerically for no-trump and by high-card and other probable tricks for a suit, and bids according to the upper groups of indicia on the no-trump or suit side of the device, respectively. His partner slides the central groups of indicia to the right until its zero line is under the original bid and, having counted his hand, reads on the lower groups of indicia the proper raise or jump under the "count" of his own hand on the central groups of indicia.

In the case of the original bid of one no-trump, the device takes cognizance of the change in the "count" requirements due to location, 13 for dealer, 12 for second hand, 14 for third hand and 15 for fourth hand, but to avoid unnecessary complications in jumping requirements, the zero line of the movable indicia is never placed at the 13 or 15 marks, which, therefore, have been angled into the 12 and 14 graduations respectively.

In no-trump, the device functions further in advising the original bidder of the "count" requirements for his re-bid over his partner's raise or jump. With the zero line of the sliding scale under his original bid, the arrow marked, "Re-bid +1," points to the required "count" on the upper groups of indicia for a "one" raise, and the arrow marked, "Re-bid +2," indicates the "two" raise.

Having thus described my invention, what I claim and desire to secure by Letters Patent is;

1. A card game device for the instructions of the players in estimating the combined values of hands comprising, two relatively movable cooperating members, one member being provided with two groups of indicia, one group representing suggested bids of one player and the other group the suggested bids of the partner, the movable member having a group of indicia representing the aggregate card values of the partner's hand and arranged to show the progressive relation of the bids in the two hands.

2. An appliance for teaching the bidding value of hands of playing-cards, consisting of two members, one having indicia representing count values corresponding to bidding values, the other having indicia representing count values of a related hand, one member being movably arranged with respect to the other to combine the values of the related hands.

3. A card game bidding indicator, consisting of two members, one having two sets of indicia, one set representing for one hand the progressive relation between bidding values and the aggregate values of the cards and groups of cards comprising that hand, the other set representing the same relationship for the combination of one hand with a related hand, the other member having indicia representing the aggregate value of the cards and groups of cards comprising the related hand, the two members being relatively movable, the indicia on one coordinating with those on the other.

4. A card game bid estimating device, consisting of two members, one having two sets of indicia, one set representing for one hand the progressive relation between bidding values and the aggregate values of the cards and groups of cards comprising the hand, the other set representing the same relationship for two combined hands, the other member having two sets of indicia, one set representing the aggregate value of the cards and groups of cards comprising the related hand, the other set representing progressive bidding values of the first hand, the two members being relatively movable, the indicia on one coordinating with those on the other.

5. A device for assisting card players to estimate the probable trick-taking values of their hands by counting arbitrary values ascribed to the individual cards and groups of cards comprising the hands, consisting of two members, one of which has two sets of indicia one set showing the relation between bidding values and count values for one hand and the other set showing the same relation when combined with partner's hand, the other member having one set of indicia representing the count values of partner's hand, the two said members being relatively movable to coordinate the three sets of indicia.

FRED L. SIMON.